US011315289B2

(12) United States Patent
Roimela et al.

(10) Patent No.: US 11,315,289 B2
(45) Date of Patent: Apr. 26, 2022

(54) ADAPTIVE DEPTH GUARD BAND

(71) Applicant: Nokia Technologies Oy, Espoo (FI)

(72) Inventors: Kimmo Tapio Roimela, Tampere (FI); Vinod Kumar Malamal Vadakital, Tampere (FI); Lauri Ilola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/035,991

(22) Filed: Sep. 29, 2020

(65) Prior Publication Data

US 2021/0097724 A1    Apr. 1, 2021

Related U.S. Application Data

(60) Provisional application No. 62/908,092, filed on Sep. 30, 2019.

(51) Int. Cl.
*G06T 9/00*     (2006.01)
*G06T 7/50*     (2017.01)

(52) U.S. Cl.
CPC .............. *G06T 9/00* (2013.01); *G06T 7/50* (2017.01); *G06T 2207/10016* (2013.01)

(58) Field of Classification Search
CPC .... G06T 9/00; G06T 7/50; G06T 2207/10016
See application file for complete search history.

(56) References Cited

U.S. PATENT DOCUMENTS 11,017,566 B1 *  5/2021  Tourapis ............. H03M 7/6005
11,095,908 B2 *  8/2021  Dawar ...................... G06T 9/00

(Continued)

FOREIGN PATENT DOCUMENTS

WO    WO-2019/158821 A1    8/2019

OTHER PUBLICATIONS

Schwarz, S. et al. Nokia's response to CfP for Point Cloud Compression (Category 2), MPEG document M41779. MPEG Document Management System [online], Oct. 2017, Macau, [available online on Oct. 17, 2017], [retrieved on Aug. 14, 2018]. Retrieved from <https://dms.mpeg.expert/doc_end_user/documents/120_Macau/wg11/m41779-v2-m41779.zip> abstract: sections 2, 3.1.1, 3.1.4, 3.1.5, 3.2.1, 3.3.1, 3.3.2, 5.3; Figs. 3, 6,7, 10.

(Continued)

*Primary Examiner* — David T Welch
(74) *Attorney, Agent, or Firm* — Joseph C. Drish; Harrington & Smith

(57) ABSTRACT

Apparatuses, methods, and computer programs are disclosed. An example apparatus includes at least one processor; and at least one non-transitory memory including computer program code; wherein the at least one memory and the computer program code are configured to, with the at least one processor, cause the apparatus at least to perform: signal a depth start of a patch data unit of a patch of data content based on an identifier of a tile and a patch index; wherein the depth start is used to derive a range of at least one depth value for the patch based on the patch index in a tile having the identifier; and signal a depth threshold of an immersive video extension of the patch data unit; wherein the depth threshold specifies a threshold below which an occupancy value is defined to be unoccupied for the patch based on the patch index.

23 Claims, 8 Drawing Sheets

(56) References Cited

U.S. PATENT DOCUMENTS

| | | | | |
|---|---|---|---|---|
| 2015/0187125 | A1* | 7/2015 | Hasselgren | G06T 15/405 345/422 |
| 2019/0087978 | A1* | 3/2019 | Tourapis | G06T 9/00 |
| 2019/0087979 | A1* | 3/2019 | Mammou | G06T 9/001 |
| 2019/0311500 | A1* | 10/2019 | Mammou | G06T 17/00 |
| 2019/0313110 | A1* | 10/2019 | Mammou | H04N 19/597 |
| 2020/0014953 | A1* | 1/2020 | Mammou | H04N 19/597 |
| 2020/0021847 | A1* | 1/2020 | Kim | H04N 19/17 |
| 2020/0104976 | A1* | 4/2020 | Mammou | G06T 9/00 |
| 2020/0105024 | A1* | 4/2020 | Mammou | G06T 9/001 |
| 2020/0111237 | A1* | 4/2020 | Tourapis | H04N 19/597 |
| 2020/0154137 | A1* | 5/2020 | Fleureau | H04N 19/172 |
| 2020/0219290 | A1* | 7/2020 | Tourapis | G06T 9/001 |
| 2020/0314435 | A1* | 10/2020 | Tourapis | G06T 7/74 |
| 2020/0394822 | A1* | 12/2020 | Gao | G01S 17/89 |
| 2021/0005006 | A1* | 1/2021 | Oh | G06T 15/04 |
| 2021/0090301 | A1* | 3/2021 | Mammou | G06T 3/4038 |
| 2021/0099687 | A1* | 4/2021 | Shin | H04N 13/156 |
| 2021/0099701 | A1* | 4/2021 | Tourapis | H04N 19/117 |
| 2021/0183109 | A1* | 6/2021 | Ch | H04N 19/597 |
| 2021/0266597 | A1* | 8/2021 | Kim | H04N 19/17 |

OTHER PUBLICATIONS

Boyce, J. et al. Working Draft 1 of Metadata for Immersive Media (Video), MPEG document N18464. MPEG Document Management System [online], Mar. 2019, Geneva, [available online on Apr. 26, 2019], [retrieved on Feb. 25, 2021]. Retrieved from <https://dms.mpeg.expert/doc_end_user/documents/126_Geneva/wg11/w18464.zip> sections 1, 2, 3.1.24, 5.10, 6.1, 6.5, 7.4.3.1, 8.2.1; Fig. 1.

Text of ISO/IEC CD 23090-10 Carriage of PC Data, MPEG document N18606. MPEG Document Management System [online], Aug. 23, 2019, [available online on Sep. 21, 2019], [retrieved on Mar. 22, 2021]. Retrieved from <https://dms.mpeg.expert/doc_end_user/documents/127_Gothenburg/wg11/w18606.zip> sections 2, 6.3.1, 6.4.1; Figs. 1, 2.

Roimela, K. et al. Adaptive multiplexing of occupancy and depth in IV, MPEG document M50815. MPEG Document Management System [online], Oct. 2019, [available online on Oct. 2, 2019], [retrieved on Feb. 24, 2021], Retrieved from <https://dms.mpeg.expert/doc_end_user/documents/128_Geneva/wg11/m50815-v1-M50815_AdaptivemultiplexingofoccupancyanddepthinIV.zip> the whole document.

* cited by examiner

| | DESCRIPTOR |
|---|---|
| camera_params_list() { | |
|   num_cameras_minus1 | u(16) |
|   for ( i = 0; i <= num_cameras_minus1; i++) { | |
|     cam_pos_x[i] | u(32) |
|     cam_pos_y[i] | u(32) |
|     cam_pos_z[i] | u(32) |
|     cam_yaw[i] | u(32) |
|     cam_pitch[i] | u(32) |
|     cam_roll[i] | u(32) |
|   } | |
|   intrinsic_params_equal_flag | u(1) |
|   for ( i = 0; i <= intrinsic_params_equal_flag ? 0: num_cameras_minus1; i++) { | |
|     camera_intrinsics(i) | |
|   } | |
|   depth_quantization_params_equal_flag | u(1) |
|   for ( i = 0; i <= depth_quantization_equal_flag ? 0: num_cameras_minus1; i++) { | |
|     depth_quantization(i) | |
|   } | |
|   adaptiveDepthGuardBandFlag | u(2) |
|   if (adaptiveDepthGuardBandFlag > 1 ) { | |
|     for ( i = 0; i <= adaptiveDepthGuardBandFlag == 2 ? 0: num_cameras_minus1; i++) { | |
|       adaptiveDepthGuardBand() | |

FIG. 3

| | DESCRIPTOR |
|---|---|
| atlas_params(a) { | |
|   num_patches_minus1[a] | u(16) |
|   atlas_width[a] | u(16) |
|   atlas_height[a] | u(16) |
|   for (i = 0; i <= num_patches_minus1; i++) { | |
|     view_id[a][i] | u(v) |
|     patch_width_in_view[a][i] | u(v) |
|     patch_height_in_view[a][i] | u(v) |
|     patch_pos_in_atlas_x[a][i] | u(v) |
|     patch_pos_in_atlas_y[a][i] | u(v) |
|     patch_pos_in_view_x[a][i] | u(v) |
|     patch_pos_in_view_y[a][i] | u(v) |
|     patch_rotation[a][i] | u(3) |
|     perPatchAdaptiveDepthGuard[a][i] | u(2) |
|     if (perPatchAdaptiveDepthGuard == 1) { | |
|       adaptiveDepthGuardBand() | |

FIG.4

| sei_payload(payloadType, payloadSize) { | DESCRIPTOR |
|---|---|
| adaptiveDepthGuardBand() | |
| } | |

FIG.5

| sei_payload(payloadType, payloadSize) { | DESCRIPTOR |
|---|---|
| for(int i = 0; i < num_cameras_minus1; i++) { | |
| view_id | |
| adaptiveDepthGuardBand() | |
| } | |
| } | |

FIG.6

ADAPTIVE DEPTH GUARD BAND

RELATED APPLICATION

This application claims priority to U.S. Provisional Application No. 62/908,092, filed Sep. 30, 2019, which is hereby incorporated by reference in its entirety.

TECHNICAL FIELD

The examples and non-limiting embodiments relate generally to multimedia, and more particularly, to adaptive depth guard band.

BACKGROUND

It is known to perform video coding and decoding.

SUMMARY

In accordance with an aspect, an apparatus includes at least one processor; and at least one non-transitory memory including computer program code; wherein the at least one memory and the computer program code are configured to, with the at least one processor, cause the apparatus at least to perform: signal a depth start of a patch data unit of a patch of data content based on an identifier of a tile and a patch index; wherein the depth start is used to derive a range of at least one depth value for the patch based on the patch index in a tile having the identifier; and signal a depth threshold of an immersive video extension of the patch data unit; wherein the depth threshold specifies a threshold below which an occupancy value is defined to be unoccupied for the patch based on the patch index.

In accordance with an aspect, a method includes signaling a depth start of a patch data unit of a patch of data content based on an identifier of a tile and a patch index; wherein the depth start is used to derive a range of at least one depth value for the patch based on the patch index in a tile having the identifier; and signaling a depth threshold of an immersive video extension of the patch data unit; wherein the depth threshold specifies a threshold below which an occupancy value is defined to be unoccupied for the patch based on the patch index.

In accordance with an aspect, a non-transitory program storage device readable by a machine, tangibly embodying a program of instructions executable by the machine for performing operations is provided, the operations comprising: signaling a depth start of a patch data unit of a patch of data content based on an identifier of a tile and a patch index; wherein the depth start is used to derive a range of at least one depth value for the patch based on the patch index in a tile having the identifier; and signaling a depth threshold of an immersive video extension of the patch data unit; wherein the depth threshold specifies a threshold below which an occupancy value is defined to be unoccupied for the patch based on the patch index.

BRIEF DESCRIPTION OF THE DRAWINGS

The foregoing aspects and other features are explained in the following description, taken in connection with the accompanying drawings, wherein:

FIG. 3 is an example code excerpt that shows per sequence and per view signaling of use of adaptive depth guard band for metadata bitstream.

FIG. 4 is an example code excerpt that shows per patch signaling of use of adaptive depth guard band.

FIG. 5 is an example code excerpt that shows signaling of adaptive depth guard band values as a supplemental enhancement information (SEI) message.

FIG. 6 is an example code excerpt that shows per view level signaling of adaptive depth guard band using another type of SEI message.

DETAILED DESCRIPTION OF EXAMPLE EMBODIMENTS

Figure 1:
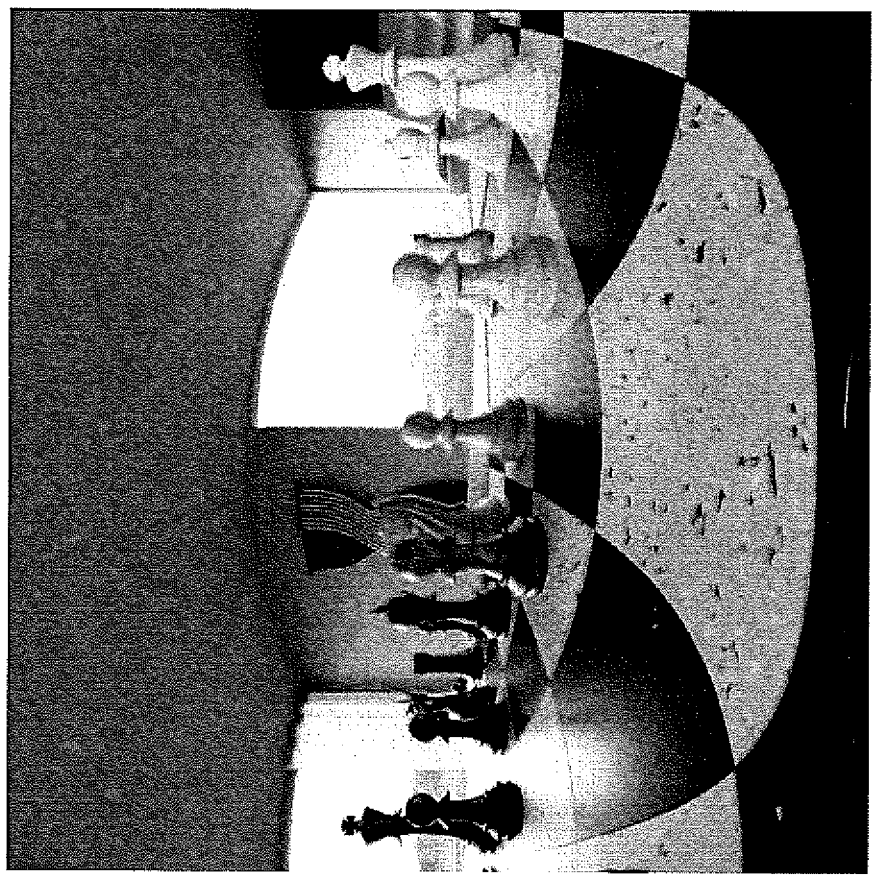
FIG. 1 shows a frame of a scene coded at quantization parameter (QP) 22 using a high efficiency video coding (HEVC) encoder.

The following acronyms and abbreviations that may be found in the specification and/or the drawing figures are defined as follows:
2D or 2d two-dimensional
3D or 3d three-dimensional
cam camera
DASH Dynamic Adaptive Streaming
GOP group of pictures
HEVC high efficiency video coding
id or ID identifier
I/F interface
I/O input/output
ISO International Organization for Standardization
ISOBMFF ISO base media file format
max maximum
min minimum
(M)IV (Metadata for) Immersive Video or MPEG Immersive Video
MPD Media Presentation Description
MPEG moving picture experts group
num number
NW network
params parameters
pos position
QP quantization parameter
SEI supplemental enhancement information
u( ) unsigned Upcoming immersive 3D video standards such as MPEG (M)IV code dynamic 3D content as patches in a 2D video atlas, each patch containing color information for texture and depth information for the geometry. The examples described herein are particularly useful for technologies which embed occupancy information in depth information.

In depth coding (in (M)IV for example), it is necessary to discern between pixels in the atlas that are part of the 3D model being coded, and pixels that are not; so-called occupied and non-occupied pixels, respectively. The renderer or view synthesizer uses this occupancy information to effectively discard non-occupied pixels. Corruption of this occupancy information due to video compression may result in geometry being missing from, or spurious geometry noise being added to the final rendered image.

Figure 2:
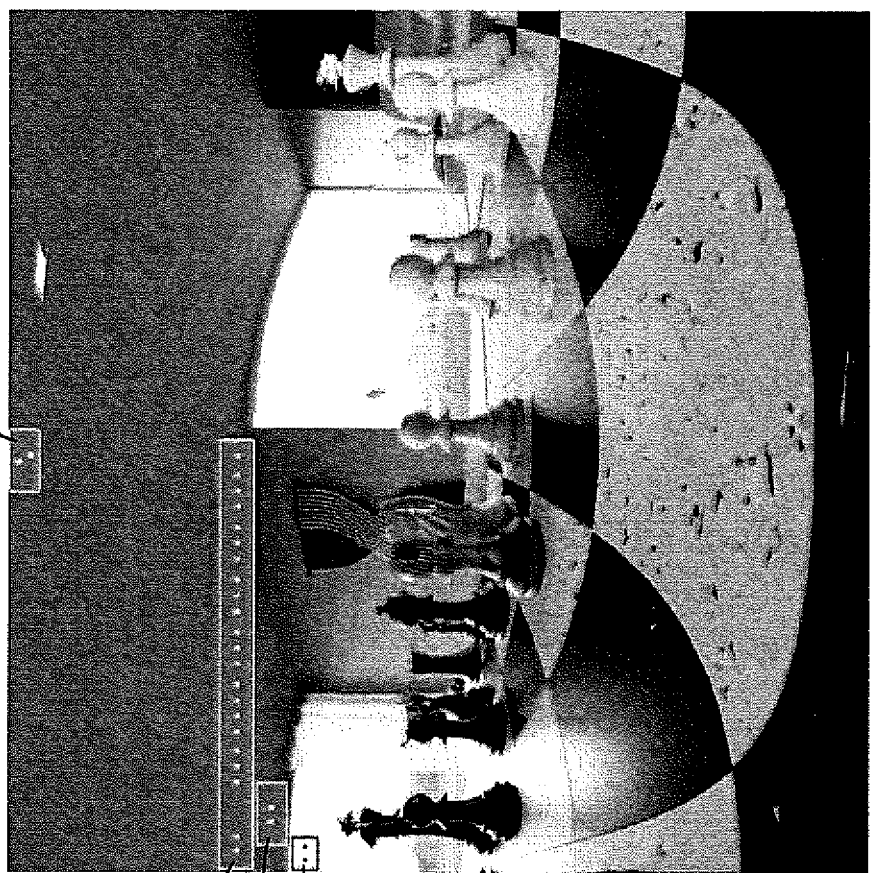
FIG. 2 shows the frame of the scene shown in FIG. 1 coded at QP 42 using an HEVC encoder.

FIG. 1 shows a frame of a scene 100 coded at quantization parameter (QP) 22 using a high efficiency video coding (HEVC) encoder. FIG. 2 shows the frame of the scene 200 shown in FIG. 1 coded at QP 42 using an HEVC encoder. Notice the noise (shown as pixels 202, 204, 206, and 208) added because of the wrong geometry.

In (M)IV currently, the occupancy information is multiplexed into the depth channel so that a certain range of depth values (for example, 0-63) is used to signal unoccupied pixels, while the rest of the values (for example, 64-1023 in a 10-bit channel) contain the depth data. This fixed guard band works for non-compressed data, but increasing compression results in increased corruption of the data.

The examples described herein provide new metadata to make the guard band range adjustable by the content author at either sequence, view or patch level. This helps to adjust the coding to avoid undue corruption at different compression levels.

In the current (M)IV, there is a hardcoded guard band size of 64. This is interpreted so that values between 0 . . . 63 indicate unoccupied pixels, and values between 64 . . . 1023 is an actual coded depth value that can be normalized back to the 0 . . . 1 range by knowing the min/max quantized values of 64 and 1023, respectively.

The examples described herein describe replacing the hardcoded guard band size with two explicit pieces of metadata: guard band size, and threshold depth value. These are denoted slightly differently as depthStart, indicating the first valid depth value in the coded channel, and occupancyThreshold, indicating the threshold value for detecting a pixel as unoccupied.

The maximum quantized value in the coding channel is denoted with the variable channelMax. For a typical 10-bit video signal, channelMax is 1023.

Explicit guard band and threshold value decoding. In the model described herein, a pixel should be deemed occupied if the quantized depth channel value k>=occupancyThreshold, and unoccupied if k<occupancyThreshold. Since values below depthStart can now also represent occupied pixels, the quantized depth value for occupied pixels is clamped to [depthStart, channelMax]. Thus, a normalized depth channel value d can be reconstructed for any occupied pixel via:

$$d=\max(0, k-\text{depthStart})/(\text{channelMax}-\text{depthStart})$$

Note that alternative formulations with channelMax defined as 1024 instead, as well as applying different rounding rules to dequantization, are trivial and do not change the essence of the idea. Similarly, the depth value d may represent linear depth, 1/z, normalized disparity, or any other normalized depth information. This is typically dependent on patch metadata and outside of the scope of this description.

The guard band may also be placed in the high value range [depthStart+1, channelMax] instead, again with a trivial change in the above while following the same basic idea.

EXAMPLES

For example, assume depthStart=64 and occupancyThreshold=64. This is equivalent to the basic (M)IV case, and the renderer may interpret values 0 . . . 63 as unoccupied, and 64 . . . 1023 as quantized depth values mapping to the 0 . . . 1 range.

For heavy compression, the values may be set to be depthStart=512 and occupancyThreshold=256. This may basically allocate the top bit of the 10-bit channel for signaling occupancy, while allowing for considerable signal distortion also into the direction of the guard band before resulting in invalid geometry.

Encoder loop optimization. The examples described herein enable optimization of the depth decoding process in the encoding phase, taking into account the artifacts resulting from video compression in the depth channel and minimizing incorrect geometry in the final rendered image. This can be done by the following process:

1) Compress the packed depth atlas at the desired video bitrate(s) using (a) selected value(s) of depthStart.
2) Select an initial value of occupancyThreshold.
3) Decode the compressed depth atlas.
4) Compare the decoded depth atlas with the original, uncompressed atlas to determine the number of incorrect occupancy values given the current occupancyThreshold.
5) Adjust occupancyThreshold and repeat from step 4 until the value is found that minimizes the number of incorrect occupancy values.
6) Write the final occupancyThreshold into the metadata.

Note that it is also possible to apply a similar optimization method to depthStart, by recompressing the depth atlas for each candidate value of depthStart. This way, both parameters can be optimized for a given bitrate.

Potential embodiments in (M)IV metadata. In one embodiment the occupancyThreshold and depthStart values may be signaled inside metadata (M)IV bitstream. There are different levels of signaling which may include per sequence signaling, per view signaling or per patch signaling. In general the adaptive depth guard band signaling requires defining depthStart and occupancyThreshold values. As an example the following kind of structure may be used.

| | Descriptor |
|---|---|
| adaptiveDepthGuardBand( ) { | |
|    depthStart | u(16) |
|    occupancyThreshold | u(16) |
| } | | depthStart indicates which value represents minimum value for depth range in video channel.

occupancyThreshold indicates the minimum value which may be still considered as a valid depth value.

FIG. 3 is an example 300 how such signaling 302 may look like for per sequence and per view signaling. adaptiveDepthGuardBandFlag indicates if adaptive depth guard band is used for metadata bitstream. adaptiveDepthGuardBandFlag==0 indicates that no depth guard adaptation is used. adaptiveDepthGuardBandFlag==1 indicates that per patch depth guard values should be used. adaptiveDepthGuardBandFlag==2 indicates that per sequence values for depth guard adaptations should be used. adaptiveDepthGuardBandFlag==3 indicates that per view depth guard values should be used.

Regarding per patch signaling a different metadata structure may need to be used as described in FIG. 4. Accordingly, FIG. 4 is an example code excerpt 400 that shows per patch signaling 402 of use of adaptive depth guard band. Per patch signaling of depth guard band validity is required, for which purpose, perPatchAdaptiveDepthGuard is introduced. This enables signaling of per patch adaptive depth guard band or revert to global default values. perPatchAdaptiveDepthGuard==1 indicate that per patch adaptive depth guard band values should be used. perPatchAdaptiveDepthGuard==2 indicates that sequence level adaptive depth guard band values should be used. perPatchAdaptiveDepth- Guard==3 indicates that per view adaptive depth guard band values should be used. A different embodiment may omit explicit coding of the occupancyThreshold value and derive it from the depthStart value instead. As an example, occupancyThreshold may be set to depthStart/2 implicitly.

Potential embodiments in SEI messages. In another embodiment adaptive depth guard band values may be signaled as a SEI message. The usage of the SEI message may be mandated by (M)IV profiles. FIG. 5 is an example of what the SEI message 500 may look like. In this example the depth guard band is signaled 502 per sequence. payloadType may be defined in the (M)IV specification in a way that it doesn't collide with other existing payload types. payloadSize may be 32.

If per view level of depth guard band signaling is needed, another type of SEI message may be used as shown in FIG. 6. Accordingly, FIG. 6 is an example code excerpt 600 that shows per view level signaling 602 of adaptive depth guard band using another type of SEI message. A similar method may be applied to signal per patch adaptive depth guard band values, but instead of using num_cameras_minus1, each atlas and patch are looped through.

Potential embodiments in file formats. In another embodiment adaptive depth guard band values may be signaled in file formats such as ISOBMFF. ISOBMFF level adaptive depth guard band signaling is ideally used for per sequence or GOP guard band values and it doesn't scale well for per view or per patch level signaling. As the signaling only relates to depth information it may be stored in video component tracks which are used to store depth information. A single file may contain one or more adaptations of depth information with different bitrates, in which case each adaptation is stored as a separate track. Therefore track level boxes should be considered for storing such infoLitiation. As an example Track Header Box, Metadata Box or User Data Box may be used.

The example metadata structures described herein may be part of compliant (M)IV bitstream and thus conformant decoders may have an ability to parse it.

Figure 7:
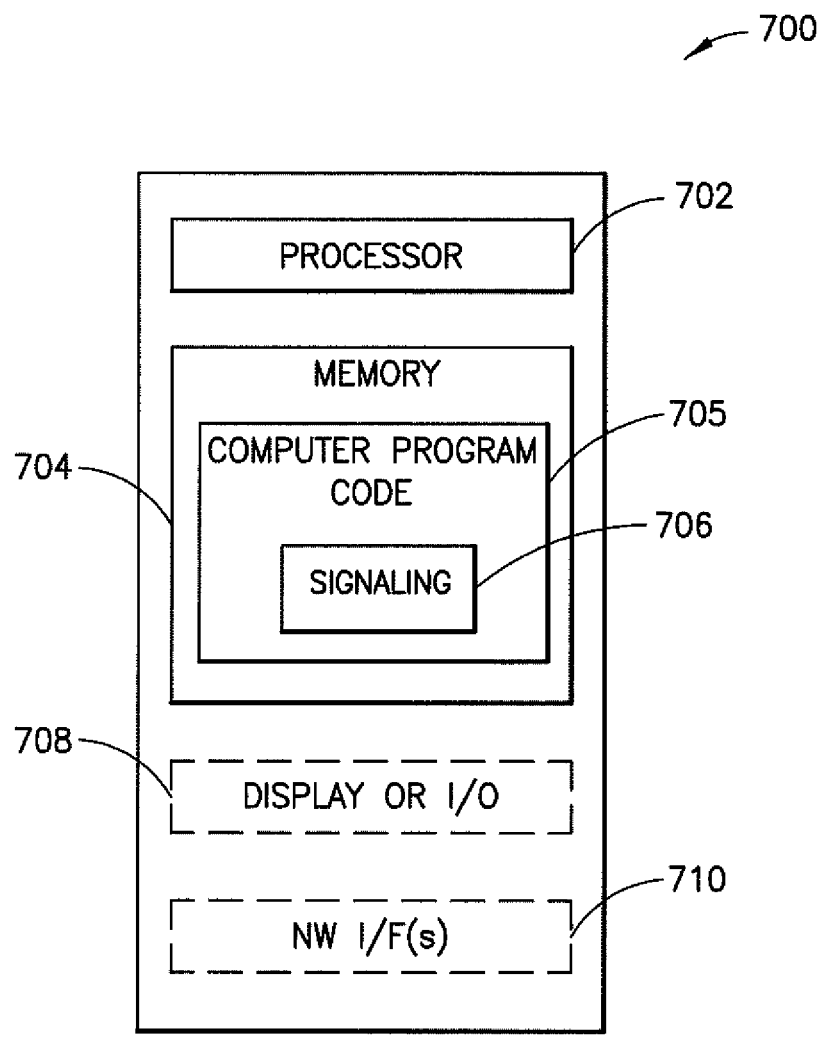
FIG. 7 is an apparatus configured to implement an adaptive guard band.

FIG. 7 is an apparatus 700 configured to implement an adaptive guard band. The apparatus 700 includes at least one processor 702, and at least one non-transitory memory 704 including computer program code 705, wherein the at least one memory 704 and the computer program code 705 are configured to, with the at least one processor 702, cause the apparatus 700 at least to perform an implementation of an adaptive guard band signaling 706 based on the examples described herein. Signaling 706 may be manifested in the form of circuitry, a process, component, module, function or combination thereof. The apparatus 700 optionally includes a display and/or I/O interface 708 which in some examples depicts the results of an encoding or decoding process, such as the image results shown in FIG. 1 and FIG. 2, or the result(s) of signaling 706. In some examples, the display and/or I/O 708 is located external to the apparatus 700. The display and/or I/O interface 708 may also be configured to receive input such as user input. The apparatus 700 also optionally includes one or more network (NW) interfaces (I/F(s)) 710. The NW I/F(s) 710 may be wired and/or wireless and communicate over the Internet/other network(s) via any communication technique. The NW I/F(s) 710 may comprise one or more transmitters and one or more receivers. The apparatus 700 may be a remote, virtual or cloud apparatus. The apparatus 700 may be implemented in hardware.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

The memory 704 may be implemented using any suitable data storage technology, such as semiconductor based memory devices, flash memory, magnetic memory devices and systems, optical memory devices and systems, fixed memory and removable memory. The memory 704 may comprise a database for storing data.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 8:
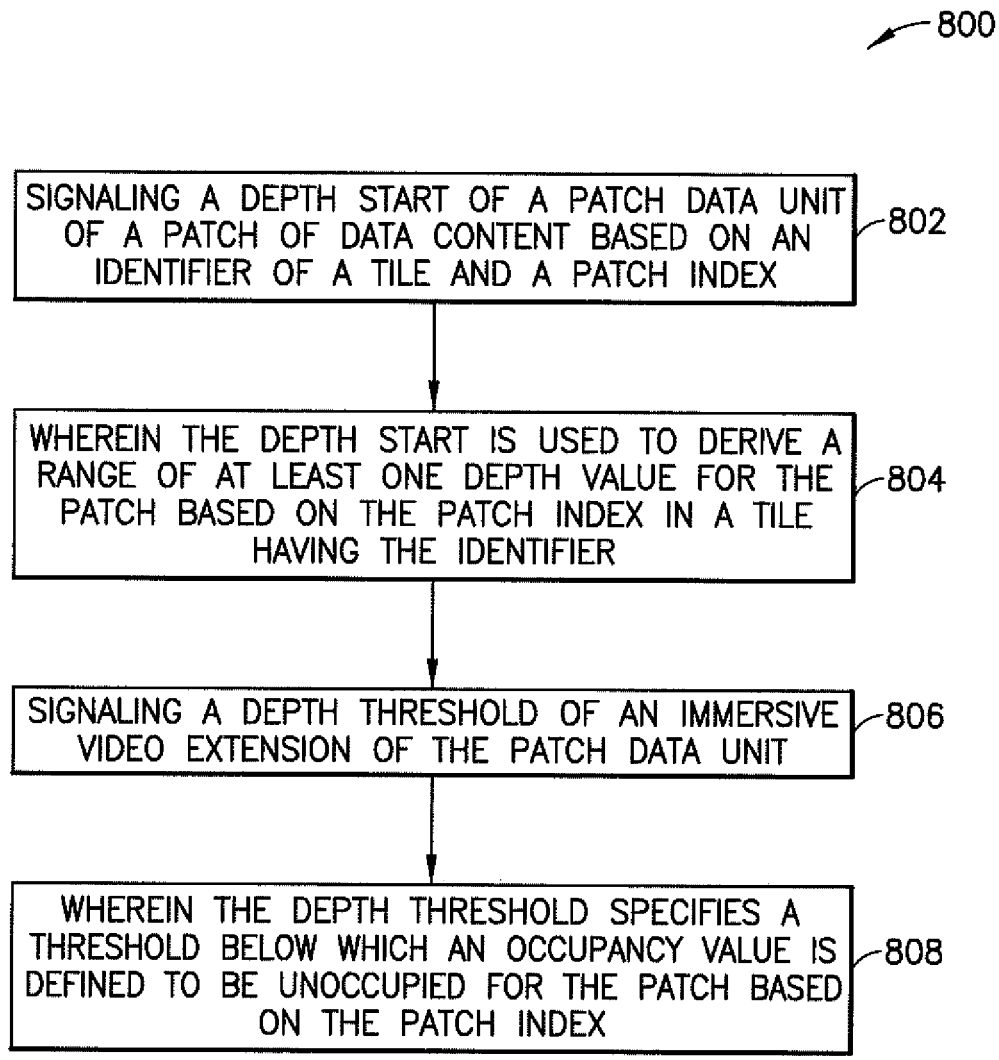
FIG. 8 is an example method to implement an adaptive depth guard band.

FIG. 8 is an example method 800 to implement an adaptive depth guard band. At 802, the method includes signaling a depth start of a patch data unit of a patch of data content based on an identifier of a tile and a patch index. At 804, the method includes wherein the depth start is used to derive a range of at least one depth value for the patch based on the patch index in a tile having the identifier. At 806, the method includes signaling a depth threshold of an immersive video extension of the patch data unit. At 808, the method includes wherein the depth threshold specifies a threshold below which an occupancy value is defined to be unoccupied for the patch based on the patch index.

Figure 9:
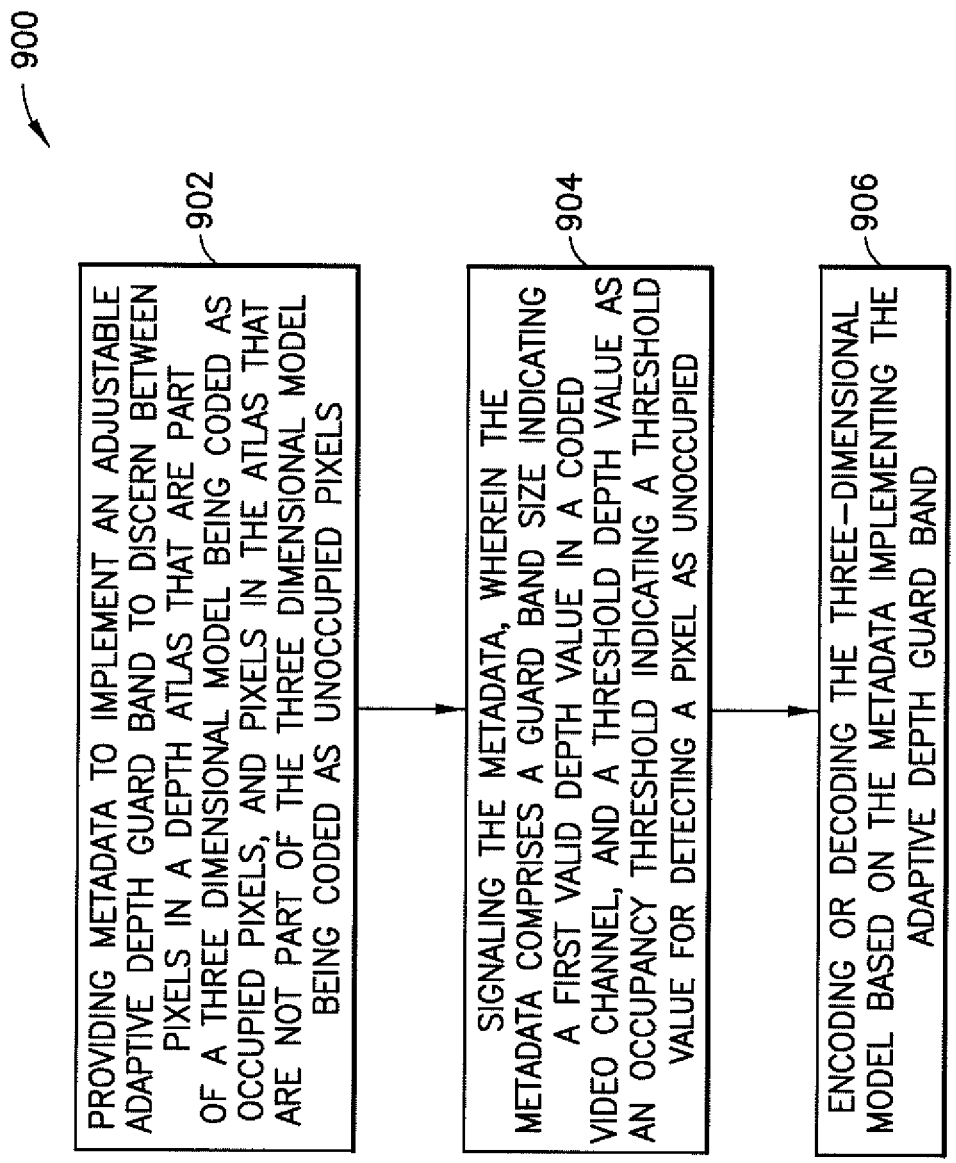
FIG. 9 is another example method to implement an adaptive depth guard band.

FIG. 9 is another example method 900 to implement an adaptive depth guard band. At 902, the method includes providing metadata to implement an adjustable adaptive depth guard band to discern between pixels in a depth atlas that are part of a three dimensional model being coded as occupied pixels, and pixels in the atlas that are not part of the three dimensional model being coded as unoccupied pixels. At 904, the method includes signaling the metadata, wherein the metadata comprises a guard band size indicating a first valid depth value in a coded video channel, and a threshold depth value as an occupancy threshold indicating a threshold value for detecting a pixel as unoccupied. At 906, the method includes encoding or decoding the three-dimensional model based on the metadata implementing the adaptive depth guard band.

An example apparatus includes at least one processor; and at least one non-transitory memory including computer program code; wherein the at least one memory and the computer program code are configured to, with the at least one processor, cause the apparatus at least to perform: signal a depth start of a patch data unit of a patch of data content based on an identifier of a tile and a patch index; wherein the depth start is used to derive a range of at least one depth value for the patch based on the patch index in a tile having the identifier; and signal a depth threshold of an immersive video extension of the patch data unit; wherein the depth threshold specifies a threshold below which an occupancy value is defined to be unoccupied for the patch based on the patch index.

The apparatus may further include wherein the at least one memory and the computer program code are further configured to, with the at least one processor, cause the apparatus at least to perform: encode or decode a three-dimensional model based on the depth start and the depth threshold.

The apparatus may further include wherein the depth start comprises a value equal to zero when the depth start is signaled as not present.

The apparatus may further include wherein the depth start is based on a quantizer.

The apparatus may further include wherein geometry and attribute values of unoccupied pixels are ignored by a renderer of immersive video.

The apparatus may further include wherein a number of bits used to represent the depth threshold is based on an atlas sequence parameter set geometry depth.

The apparatus may further include wherein the depth threshold is based on a default occupancy threshold when the depth threshold is signaled as not present.

The apparatus may further include wherein the depth start and depth threshold are provided as metadata to discern between pixels in a depth atlas that are part of a three-dimensional model being coded as occupied pixels, and pixels in the atlas that are not part of the three-dimensional model being coded as unoccupied pixels.

The apparatus may further include wherein the at least one memory and the computer program code are further configured to, with the at least one processor, cause the apparatus at least to perform: signal the metadata, wherein the metadata comprises a guard band size indicating the depth start and the depth threshold indicating the threshold for detecting a pixel as unoccupied.

The apparatus may further include wherein the at least one memory and the computer program code are further configured to, with the at least one processor, cause the apparatus at least to perform: encode or decode a three-dimensional model based on the metadata.

The apparatus may be implemented as an adjustable adaptive depth guard band.

The apparatus may further include wherein a pixel is considered occupied in response to a quantized depth channel value being greater than or equal to the depth threshold, and the pixel is considered unoccupied in response to the quantized depth channel value being less than the depth threshold.

The apparatus may further include wherein the at least one memory and the computer program code are further configured to, with the at least one processor, cause the apparatus at least to perform: provide a maximum quantized value in the coded channel.

The apparatus may further include wherein a quantized depth channel value for occupied pixels is given to be between the depth start and the maximum quantized value in the coded channel.

The apparatus may further include wherein a normalized depth channel value is reconstructed for any occupied pixel.

The apparatus may further include wherein the at least one memory and the computer program code are further configured to, with the at least one processor, cause the apparatus at least to perform: compress a depth atlas at a desired video bitrate using one or more selected values of the depth start; select an initial value of the depth threshold; decode the depth atlas; determine a number of incorrect occupancy values given a current value of the depth threshold, by comparing the decoded depth atlas with an original uncompressed depth atlas; adjust the depth threshold and repeat from the determining the number of incorrect occupancy values until a value of the depth threshold is found that minimizes the number of incorrect occupancy values; and write a final occupancy threshold into metadata.

The apparatus may further include wherein the at least one memory and the computer program code are further configured to, with the at least one processor, cause the apparatus at least to perform: determine the depth start by recompressing a depth atlas for each candidate value of the depth start.

The apparatus may further include wherein the at least one memory and the computer program code are further configured to, with the at least one processor, cause the apparatus at least to perform: signal the depth start inside a metadata for immersive video bitstream, wherein levels of signaling comprise one or more of per sequence signaling, per view signaling, or per patch signaling.

The apparatus may further include wherein the depth threshold is derived from the depth start.

The apparatus may further include wherein at least one of the depth start or the depth threshold is signaled as a supplemental enhancement information message.

The apparatus may further include wherein the at least one memory and the computer program code are further configured to, with the at least one processor, cause the apparatus at least to perform: signal at least one of the depth start or the depth threshold in a base media file format; wherein a single file contains one or more adaptations of depth information with different bitrates, each adaptation being stored as a separate track; wherein track specific depth guard band related values are stored under a track box.

An example method includes signaling a depth start of a patch data unit of a patch of data content based on an identifier of a tile and a patch index; wherein the depth start is used to derive a range of at least one depth value for the patch based on the patch index in a tile having the identifier; and signaling a depth threshold of an immersive video extension of the patch data unit; wherein the depth threshold specifies a threshold below which an occupancy value is defined to be unoccupied for the patch based on the patch index.

The method may further include encoding or decoding a three-dimensional model based on the depth start and the depth threshold.

The method may further include wherein the depth start comprises a value equal to zero when the depth start is signaled as not present.

The method may further include wherein the depth start is based on a quantizer.

The method may further include wherein geometry and attribute values of unoccupied pixels are ignored by a renderer of immersive video.

The method may further include wherein a number of bits used to represent the depth threshold is based on an atlas sequence parameter set geometry depth.

The method may further include wherein the depth threshold is based on a default occupancy threshold when the depth threshold is signaled as not present.

The method may further include wherein the depth start and depth threshold are provided as metadata to discern between pixels in a depth atlas that are part of a three-dimensional model being coded as occupied pixels, and pixels in the atlas that are not part of the three-dimensional model being coded as unoccupied pixels.

The method may further include signaling the metadata, wherein the metadata comprises a guard band size indicating the depth start and the depth threshold indicating the threshold for detecting a pixel as unoccupied.

The method may further include encoding or decoding a three-dimensional model based on the metadata.

The method may be implemented as an adjustable adaptive depth guard band.

The method may further include wherein a pixel is considered occupied in response to a quantized depth channel value being greater than or equal to the depth threshold, and the pixel is considered unoccupied in response to the quantized depth channel value being less than the depth threshold.

The method may further include providing a maximum quantized value in the coded channel.

The method may further include wherein a quantized depth channel value for occupied pixels is given to be between the depth start and the maximum quantized value in the coded channel.

The method may further include wherein a normalized depth channel value is reconstructed for any occupied pixel.

The method may further include compressing a depth atlas at a desired video bitrate using one or more selected values of the depth start; selecting an initial value of the depth threshold; decoding the depth atlas; determining a number of incorrect occupancy values given a current value of the depth threshold, by comparing the decoded depth atlas with an original uncompressed depth atlas; adjusting the depth threshold and repeat from the determining the number of incorrect occupancy values until a value of the depth threshold is found that minimizes the number of incorrect occupancy values; and writing a final occupancy threshold into metadata.

The method may further include determining the depth start by recompressing a depth atlas for each candidate value of the depth start.

The method may further include signaling the depth start inside a metadata for immersive video bitstream, wherein levels of signaling comprise one or more of per sequence signaling, per view signaling, or per patch signaling.

The method may further include wherein the depth threshold is derived from the depth start.

The method may further include wherein at least one of the depth start or the depth threshold is signaled as a supplemental enhancement information message.

The method may further include signaling at least one of the depth start or the depth threshold in a base media file format; wherein a single file contains one or more adaptations of depth information with different bitrates, each adaptation being stored as a separate track; wherein track specific depth guard band related values are stored under a track box.

An example non-transitory program storage device readable by a machine, tangibly embodying a program of instructions executable by the machine for performing operations is provided, the operations comprising: signaling a depth start of a patch data unit of a patch of data content based on an identifier of a tile and a patch index; wherein the depth start is used to derive a range of at least one depth value for the patch based on the patch index in a tile having the identifier; and signaling a depth threshold of an immersive video extension of the patch data unit; wherein the depth threshold specifies a threshold below which an occupancy value is defined to be unoccupied for the patch based on the patch index.

The operations of the non-transitory program storage device may further include encoding or decoding a three-dimensional model based on the depth start and the depth threshold.

The non-transitory program storage device may further include wherein the depth start comprises a value equal to zero when the depth start is signaled as not present.

The non-transitory program storage device may further include wherein the depth start is based on a quantizer.

The non-transitory program storage device may further include wherein geometry and attribute values of unoccupied pixels are ignored by a renderer of immersive video.

The non-transitory program storage device may further include wherein a number of bits used to represent the depth threshold is based on an atlas sequence parameter set geometry depth.

The non-transitory program storage device may further include wherein the depth threshold is based on a default occupancy threshold when the depth threshold is signaled as not present.

The non-transitory program storage device may further include wherein the depth start and depth threshold are provided as metadata to discern between pixels in a depth atlas that are part of a three-dimensional model being coded as occupied pixels, and pixels in the atlas that are not part of the three-dimensional model being coded as unoccupied pixels.

The operations of the non-transitory program storage device may further include signaling the metadata, wherein the metadata comprises a guard band size indicating the depth start and the depth threshold indicating the threshold for detecting a pixel as unoccupied.

The operations of the non-transitory program storage device may further include encoding or decoding a three-dimensional model based on the metadata.

The non-transitory program storage device may be implemented as an adjustable adaptive depth guard band.

The non-transitory program storage device may further include wherein a pixel is considered occupied in response to a quantized depth channel value being greater than or equal to the depth threshold, and the pixel is considered unoccupied in response to the quantized depth channel value being less than the depth threshold.

The operations of the non-transitory program storage device may further include providing a maximum quantized value in the coded channel.

The non-transitory program storage device may further include wherein a quantized depth channel value for occupied pixels is given to be between the depth start and the maximum quantized value in the coded channel.

The non-transitory program storage device may further include wherein a normalized depth channel value is reconstructed for any occupied pixel.

The operations of the non-transitory program storage device may further include compressing a depth atlas at a desired video bitrate using one or more selected values of the depth start; selecting an initial value of the depth threshold; decoding the depth atlas; determining a number of incorrect occupancy values given a current value of the depth threshold, by comparing the decoded depth atlas with an original uncompressed depth atlas; adjusting the depth threshold and repeat from the determining the number of incorrect occupancy values until a value of the depth threshold is found that minimizes the number of incorrect occupancy values; and writing a final occupancy threshold into metadata.

The operations of the non-transitory program storage device may further include determining the depth start by recompressing a depth atlas for each candidate value of the depth start.

The operations of the non-transitory program storage device may further include signaling the depth start inside a metadata for immersive video bitstream, wherein levels of signaling comprise one or more of per sequence signaling, per view signaling, or per patch signaling.

The non-transitory program storage device may further include wherein the depth threshold is derived from the depth start.

The non-transitory program storage device may further include wherein at least one of the depth start or the depth threshold is signaled as a supplemental enhancement information message.

The operations of the non-transitory program storage device may further include signaling at least one of the depth start or the depth threshold in a base media file format; wherein a single file contains one or more adaptations of depth information with different bitrates, each adaptation being stored as a separate track; wherein track specific depth guard band related values are stored under a track box.

An example apparatus includes one or more circuitries configured to implement any of the methods comprising: signaling a depth start of a patch data unit of a patch of data content based on an identifier of a tile and a patch index; wherein the depth start is used to derive a range of at least one depth value for the patch based on the patch index in a tile having the identifier; and signaling a depth threshold of an immersive video extension of the patch data unit; wherein the depth threshold specifies a threshold below which an occupancy value is defined to be unoccupied for the patch based on the patch index.

An example apparatus includes at least one processor; and at least one non-transitory memory including computer program code; wherein the at least one memory and the computer program code are configured to, with the at least one processor, cause the apparatus at least to perform: provide metadata to implement an adjustable adaptive depth guard band to discern between pixels in a depth atlas that are part of a three-dimensional model being coded as occupied pixels, and pixels in the atlas that are not part of the three-dimensional model being coded as unoccupied pixels; signal the metadata, wherein the metadata comprises a guard band size indicating a first valid depth value in a coded video channel, and a threshold depth value as an occupancy threshold indicating a threshold depth value for detecting a pixel as unoccupied; and encode or decode the three-dimensional model based on the metadata implementing the adaptive depth guard band.

The apparatus may further include wherein a pixel is considered occupied in response to a quantized depth channel value being greater than or equal to the occupancy threshold, and the pixel is considered unoccupied in response to the quantized depth channel value being less than the occupancy threshold.

The apparatus may further include wherein the at least one memory and the computer program code are further configured to, with the at least one processor, cause the apparatus at least to perform: provide a maximum quantized value in the coded channel.

The apparatus may further include wherein a quantized depth channel value for occupied pixels is given to be between the first valid depth value and the maximum quantized value in the coded channel.

The apparatus may further include wherein a normalized depth channel value d is reconstructed for any occupied pixel via d=max(0, k−depthStart)/(channelMax−depthStart), wherein: k corresponds to the quantized depth channel value; depthStart corresponds to the first valid depth value; and channelMax corresponds to the maximum quantized value in the coded channel.

The apparatus may further include wherein the at least one memory and the computer program code are further configured to, with the at least one processor, cause the apparatus at least to perform: compress the depth atlas at a desired video bitrate using one or more selected values of the first valid depth value; select an initial value of the occupancy threshold; decode the depth atlas; determine a number of incorrect occupancy values given a current value of the occupancy threshold, by comparing the decoded depth atlas with an original uncompressed depth atlas; adjust the occupancy threshold and repeat from the determining the number of incorrect occupancy values until a value of the occupancy threshold is found that minimizes the number of incorrect occupancy values; and write a final occupancy threshold into the metadata.

The apparatus may further include wherein the at least one memory and the computer program code are further configured to, with the at least one processor, cause the apparatus at least to perform: determine the first valid depth value in the coded channel by recompressing the depth atlas for each candidate value of the first valid depth value.

The apparatus may further include wherein the at least one memory and the computer program code are further configured to, with the at least one processor, cause the apparatus at least to perform: signal the first valid depth value inside a metadata for immersive video bitstream, wherein levels of signaling comprise one or more of per sequence signaling, per view signaling, and/or per patch signaling.

The apparatus may further include wherein the occupancy threshold is derived from the first valid depth value.

The apparatus may further include wherein values of the adaptive depth guard band are signaled as a supplemental enhancement information message.

The apparatus may further include wherein the at least one memory and the computer program code are further configured to, with the at least one processor, cause the apparatus at least to perform: signal of the adaptive depth guard band in a base media file format, wherein a single file contains one or more adaptations of depth information with different bitrates, each adaptation being stored as a separate track, wherein track specific depth guard band related values are stored under TrackBox.

An example method includes providing metadata to implement an adjustable adaptive depth guard band to discern between pixels in a depth atlas that are part of a three-dimensional model being coded as occupied pixels, and pixels in the atlas that are not part of the three-dimensional model being coded as unoccupied pixels; signaling the metadata, wherein the metadata comprises a guard band size indicating a first valid depth value in a coded video channel, and a threshold depth value as an occupancy threshold indicating a threshold value for detecting a pixel as unoccupied; and encoding or decoding the three-dimensional model based on the metadata implementing the adaptive depth guard band.

The method may further include wherein a pixel is considered occupied in response to a quantized depth channel value being greater than or equal to the occupancy threshold, and the pixel is considered unoccupied in response to the quantized depth channel value being less than the occupancy threshold.

The method may further include providing a maximum quantized value in the coded channel.

The method may further include wherein a quantized depth channel value for occupied pixels is given to be between the first valid depth value and the maximum quantized value in the coded channel.

The method may further include wherein a normalized depth channel value d is reconstructed for any occupied pixel via d=max(0, k−depthStart)/(channelMax−depthStart), wherein: k corresponds to the quantized depth channel value; depthStart corresponds to the first valid depth value; and channelMax corresponds to the maximum quantized value in the coded channel.

The method may further include compressing the depth atlas at a desired video bitrate using one or more selected values of the first valid depth value; selecting an initial value of the occupancy threshold; decoding the depth atlas; determining a number of incorrect occupancy values given a current value of the occupancy threshold, by comparing the decoded depth atlas with an original uncompressed depth atlas; adjusting the occupancy threshold and repeat from the determining the number of incorrect occupancy values until a value of the occupancy threshold is found that minimizes the number of incorrect occupancy values; and writing a final occupancy threshold into the metadata.

The method may further include determining the first valid depth value in the coded channel by recompressing the depth atlas for each candidate value of the first valid depth value.

The method may further include signaling the first valid depth value inside a metadata for immersive video bitstream, wherein levels of signaling comprise one or more of per sequence signaling, per view signaling, and/or per patch signaling.

The method may further include wherein the occupancy threshold is derived from the first valid depth value.

The method may further include wherein values of the adaptive depth guard band are signaled as a supplemental enhancement information message.

The method may further include signaling of the adaptive depth guard band in a base media file format, wherein a single file contains one or more adaptations of depth information with different bitrates, each adaptation being stored as a separate track, wherein track specific depth guard band related values are stored under TrackBox.

An example non-transitory program storage device readable by a machine, tangibly embodying a program of instructions executable by the machine for performing operations is provided, the operations comprising: providing metadata to implement an adjustable adaptive depth guard band to discern between pixels in a depth atlas that are part of a three-dimensional model being coded as occupied pixels, and pixels in the atlas that are not part of the three-dimensional model being coded as unoccupied pixels; signaling the metadata, wherein the metadata comprises a guard band size indicating a first valid depth value in a coded video channel, and a threshold depth value as an occupancy threshold indicating a threshold value for detecting a pixel as unoccupied; and encoding or decoding the three-dimensional model based on the metadata implementing the adaptive depth guard band.

The non-transitory program storage device may further include wherein a pixel is considered occupied in response to a quantized depth channel value being greater than or equal to the occupancy threshold, and the pixel is considered unoccupied in response to the quantized depth channel value being less than the occupancy threshold.

The operations of the non-transitory program storage device may further include providing a maximum quantized value in the coded channel.

The non-transitory program storage device may further include wherein a quantized depth channel value for occupied pixels is given to be between the first valid depth value and the maximum quantized value in the coded channel.

The non-transitory program storage device may further include wherein a normalized depth channel value d is reconstructed for any occupied pixel via d=max(0, k−depthStart)/(channelMax−depthStart), wherein: k corresponds to the quantized depth channel value; depthStart corresponds to the first valid depth value; and channelMax corresponds to the maximum quantized value in the coded channel.

The operations of the non-transitory program storage device may further include compressing the depth atlas at a desired video bitrate using one or more selected values of the first valid depth value; selecting an initial value of the occupancy threshold; decoding the depth atlas; determining a number of incorrect occupancy values given a current value of the occupancy threshold, by comparing the decoded depth atlas with an original uncompressed depth atlas; adjusting the occupancy threshold and repeat from the determining the number of incorrect occupancy values until a value of the occupancy threshold is found that minimizes the number of incorrect occupancy values; and writing a final occupancy threshold into the metadata.

The operations of the non-transitory program storage device may further include determining the first valid depth value in the coded channel by recompressing the depth atlas for each candidate value of the first valid depth value.

The operations of the non-transitory program storage device may further include signaling the first valid depth value inside a metadata for immersive video bitstream, wherein levels of signaling comprise one or more of per sequence signaling, per view signaling, and/or per patch signaling.

The non-transitory program storage device may further include wherein the occupancy threshold is derived from the first valid depth value.

The non-transitory program storage device may further include wherein values of the adaptive depth guard band are signaled as a supplemental enhancement information message.

The operations of the non-transitory program storage device may further include signaling of the adaptive depth guard band in a base media file format, wherein a single file contains one or more adaptations of depth information with different bitrates, each adaptation being stored as a separate track, wherein track specific depth guard band related values are stored under TrackBox.

An example apparatus includes one or more circuitries configured to implement any of the methods comprising: providing metadata to implement an adjustable adaptive depth guard band to discern between pixels in a depth atlas that are part of a three-dimensional model being coded as occupied pixels, and pixels in the atlas that are not part of the three-dimensional model being coded as unoccupied pixels; signaling the metadata, wherein the metadata comprises a guard band size indicating a first valid depth value in a coded video channel, and a threshold depth value as an occupancy threshold indicating a threshold value for detecting a pixel as unoccupied; and encoding or decoding the three-dimensional model based on the metadata implementing the adaptive depth guard band.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    at least one processor; and
    at least one non-transitory memory including computer program code;
    wherein the at least one memory and the computer program code are configured to, with the at least one processor, cause the apparatus at least to:
    signal a depth start of a patch data unit of a patch of data content, the patch data unit comprising a tile identifier of a tile and a patch index;
    wherein the depth start is used to derive a range of at least one depth value for the patch having the patch index in the tile having the tile identifier; and
    signal a depth threshold of an immersive video extension of the patch data unit;
    wherein the depth threshold specifies a threshold below which an occupancy value is defined to be unoccupied for the patch having the patch index, the depth threshold being for the patch data unit comprising the tile identifier and the patch index;
    wherein a number of bits used to represent the depth threshold is based, at least partially, on an atlas sequence parameter set geometry depth.

2. The apparatus of claim 1, wherein the at least one memory and the computer program code are further configured to, with the at least one processor, cause the apparatus at least to:
    encode or decode a three-dimensional model based on the depth start and the depth threshold.

3. The apparatus of claim 1, wherein:
    the depth start comprises a value equal to zero when the depth start is signaled as not present; or
    the depth start is based on a quantizer.

4. The apparatus of claim 1, wherein geometry and attribute values of unoccupied pixels are ignored by a renderer of immersive video.

5. The apparatus of claim 1, wherein the depth threshold is based on a default occupancy threshold when the depth threshold is signaled as not present.

6. The apparatus of claim 1, wherein the depth start and depth threshold are provided as metadata to discern between pixels in a depth atlas that are part of a three-dimensional model being coded as occupied pixels, and pixels in the atlas that are not part of the three-dimensional model being coded as unoccupied pixels.

7. The apparatus of claim 6, wherein the at least one memory and the computer program code are further configured to, with the at least one processor, cause the apparatus at least to:
    signal the metadata, wherein the metadata comprises a guard band size indicating the depth start and the depth threshold indicating the threshold for detecting a pixel as unoccupied.

8. The apparatus of claim 6, wherein the at least one memory and the computer program code are further configured to, with the at least one processor, cause the apparatus at least to:
    encode or decode a three-dimensional model based on the metadata.

9. The apparatus of claim 1, implemented as an adjustable adaptive depth guard band.

10. The apparatus of claim 1, wherein a pixel is considered occupied in response to a quantized depth channel value being greater than or equal to the depth threshold, and the pixel is considered unoccupied in response to the quantized depth channel value being less than the depth threshold.

11. The apparatus of claim 1, wherein the at least one memory and the computer program code are further configured to, with the at least one processor, cause the apparatus at least to:
    provide a maximum quantized value in a coded channel.

12. The apparatus of claim 11, wherein a quantized depth channel value for occupied pixels is given to be between the depth start and the maximum quantized value in the coded channel.

13. The apparatus of claim 12, wherein a normalized depth channel value is reconstructed for any occupied pixel.

14. The apparatus of claim 1, wherein the at least one memory and the computer program code are further configured to, with the at least one processor, cause the apparatus at least to:
    compress a depth atlas at a desired video bitrate using one or more selected values of the depth start;
    select an initial value of the depth threshold;
    decode the depth atlas;
    determine a number of incorrect occupancy values given a current value of the depth threshold, by comparing the decoded depth atlas with an original uncompressed depth atlas;
    adjust the depth threshold and repeat from the determining the number of incorrect occupancy values until a value of the depth threshold is found that minimizes the number of incorrect occupancy values; and
    write a final occupancy threshold into metadata.

15. The apparatus of claim 1, wherein the at least one memory and the computer program code are further configured to, with the at least one processor, cause the apparatus at least to:
    determine the depth start by recompressing a depth atlas for each candidate value of the depth start.

16. The apparatus of claim 1, wherein the at least one memory and the computer program code are further configured to, with the at least one processor, cause the apparatus at least to:

signal the depth start inside a metadata for immersive video bitstream, wherein levels of signaling comprise one or more of per sequence signaling or per patch signaling.

17. The apparatus of claim 1, wherein the depth threshold is derived from the depth start.

18. The apparatus of claim 1, wherein at least one of the depth start or the depth threshold is signaled as a supplemental enhancement information message.

19. The apparatus of claim 1, wherein the at least one memory and the computer program code are further configured to, with the at least one processor, cause the apparatus at least to:
    signal at least one of the depth start or the depth threshold in a base media file format;
    wherein a single file contains one or more adaptations of depth information with different bitrates, each adaptation being stored as a separate track;
    wherein track specific depth guard band related values are stored under a track box.

20. The apparatus of claim 1, wherein the depth start indicates how much depth values of the at least one depth value in the patch need to be shifted or offset in a depth dimension relative to a normal dimension of the patch to reconstruct a point cloud.

21. The apparatus of claim 1, wherein the at least one memory and the computer program code are further configured to, with the at least one processor, cause the apparatus at least to:
    signal the depth start inside a metadata for immersive video bitstream, wherein levels of signaling comprise per view signaling.

22. A method comprising:
    signaling a depth start of a patch data unit of a patch of data content, the patch data unit comprising a tile identifier of a tile and a patch index;
    wherein the depth start is used to derive a range of at least one depth value for the patch having the patch index in the tile having the tile identifier; and
    signaling a depth threshold of an immersive video extension of the patch data unit;
    wherein the depth threshold specifies a threshold below which an occupancy value is defined to be unoccupied for the patch having the patch index, the depth threshold being for the patch data unit comprising the tile identifier and the patch index;
    wherein a number of bits used to represent the depth threshold is based, at least partially, on an atlas sequence parameter set geometry depth.

23. A non-transitory program storage device readable by a machine, tangibly embodying a program of instructions executable by the machine for performing operations, the operations comprising:
    signaling a depth start of a patch data unit of a patch of data content based on an identifier of a tile and a patch index;
    wherein the depth start is used to derive a range of at least one depth value for the patch having the patch index in the tile having the tile identifier; and
    signaling a depth threshold of an immersive video extension of the patch data unit;
    wherein the depth threshold specifies a threshold below which an occupancy value is defined to be unoccupied for the patch having the patch index, the depth threshold being for the patch data unit comprising the tile identifier and the patch index;
    wherein a number of bits used to represent the depth threshold is based, at least partially, on an atlas sequence parameter set geometry depth.

* * * * *